United States Patent
Bertolotti (10) Patent No.: US 11,506,175 B2
(45) Date of Patent: Nov. 22, 2022

(54) WIND-TURBINE TOWER TO BLADE-TIP MEASURING SYSTEM

(71) Applicant: NIDEC SSB WIND SYSTEMS GMBH, Salzbergen (DE)

(72) Inventor: Fabio Bertolotti, Bad Bentheim (DE)

(73) Assignee: NIDEC SSB WIND SYSTEMS GMBH, Salzbergen (DE)

( * ) Notice: Subject to any disclaimer, the term of this patent is extended or adjusted under 35 U.S.C. 154(b) by 216 days.

(21) Appl. No.: 16/768,098

(22) PCT Filed: Dec. 4, 2018

(86) PCT No.: PCT/EP2018/083557
§ 371 (c)(1),
(2) Date: May 29, 2020

(87) PCT Pub. No.: WO2019/110624
PCT Pub. Date: Jun. 13, 2019

(65) Prior Publication Data
US 2020/0309092 A1  Oct. 1, 2020

(30) Foreign Application Priority Data
Dec. 4, 2017 (EP) .................................... 17001973

(51) Int. Cl.
*F03D 7/04* (2006.01)
*F03D 17/00* (2016.01)
*F03D 1/06* (2006.01)

(52) U.S. Cl.
CPC .......... *F03D 7/042* (2013.01); *F03D 1/0633* (2013.01); *F03D 17/00* (2016.05);
(Continued)

(58) Field of Classification Search
CPC .......... F03D 7/042; F03D 17/00; F03D 80/80; F03D 80/82; F05B 2270/17; F05B 2270/33; F05B 2270/8041
See application file for complete search history.

(56) References Cited

U.S. PATENT DOCUMENTS 9,909,570 B2 * 3/2018 Klitgaard ................ F03D 17/00
2004/0057828 A1  3/2004 Bosche
(Continued)

FOREIGN PATENT DOCUMENTS

CN  102141004 A  8/2011
CN  102384028 A  3/2012
(Continued)

OTHER PUBLICATIONS

Machine translation of DE 102005048805 A1 (Apr. 12, 2007) (Year: 2007).*

(Continued)

*Primary Examiner* — Christopher R Legendre
(74) *Attorney, Agent, or Firm* — Harness, Dickey & Pierce, P.L.C.

(57) ABSTRACT

In a wind turbine comprising a tower supporting a nacelle, at least one blade rotationally attached to the nacelle and having a blade-tip section, a system for measuring the separation distance between the tower and the blade-tip-section of the wind turbine, comprising an indicator stripe on the surface of the blade-tip section, an indicator ring encircling the tower, a camera in the nacelle and positioned such that the blade-tip section and the indicator ring are within the camera's field of view when the blade-tip is at its closest approach position to the tower, the camera digitally recording an image of its field of view at this closest approach position, the distance between indicator ring and camera being essentially equal to the distance between the indicator stripe and the camera at this closest approach position, and
(Continued)

an image processor and tip-tower clearance calculator unit receiving the digitally recorded image and calculating a physical separation distance between the indicator stripe and the indicator ring using the digitally recorded image information, the physical separation distance being indicative of the blade tip-tower clearance.

17 Claims, 7 Drawing Sheets

(52) U.S. Cl.
CPC ..... *F05B 2240/221* (2013.01); *F05B 2270/17* (2013.01); *F05B 2270/326* (2013.01); *F05B 2270/327* (2013.01); *F05B 2270/328* (2013.01); *F05B 2270/33* (2013.01); *F05B 2270/708* (2013.01); *F05B 2270/809* (2013.01); *F05B 2270/8041* (2013.01)

(56) References Cited

U.S. PATENT DOCUMENTS

| | | | |
|---|---|---|---|
| 2011/0135466 | A1 | 6/2011 | Latorre et al. |
| 2014/0140844 | A1 | 5/2014 | Slot |
| 2015/0322925 | A1 | 11/2015 | Klitgaard et al. |
| 2020/0309092 | A1* | 10/2020 | Bertolotti ............ F03D 1/0633 |

FOREIGN PATENT DOCUMENTS

| | | |
|---|---|---|
| DE | 102005048805 A1 | 4/2007 |
| DE | 202015008938 U1 | 4/2016 |

OTHER PUBLICATIONS

Lihan He et al. "Camera-Based Portable System for Wind Turbine Blade Tip Clearance Measurement", 2013 IEEE International Conference on Imaging Systems and Techniques (1st), Oct. 1, 2013 (Oct. 1, 2013), pp. 451-456, XP055364904.

Sabel J C. "Optical 3D Motion Measurement", Instrumentation and Measurement Technology Conference, 1996. IMTC-96. Conference Proceedings. Quality Measurements: The Indispensable Bridge Between Theory and Reality, IEEE Brussels, Belgium Jun. 4-6, New York, NY, USA, IEEE US, vol. 1, Jun. 4, 1996 (Jun. 4, 1996), pp. 367-370, XP010163904.

International Search Report and Written Opinion for International Application No. PCT/EP2018/083557 dated Feb. 21, 2019; ISA/EP.

Office Action regarding Chinese Patent Application No. 201880078569.6, dated Jun. 29, 2021.

* cited by examiner

WIND-TURBINE TOWER TO BLADE-TIP MEASURING SYSTEM

CROSS-REFERENCE TO RELATED APPLICATIONS

This application is a 371 U.S. National Stage of International Application No. PCT/EP2018/083557, filed Dec. 4, 2018, and claims priority to European Patent Application No. 170019731, filed Dec. 4, 2017, the disclosures of which are herein incorporated by reference in their entirety.

The invention relates to a wind turbine having a tower to blade-tip clearance measuring system. Further, the invention relates to method for estimating a blade-tip to tower distance in a wind turbine. Tip-tower clearance estimators currently known in the art are either too inaccurate, too expensive, or unreliable, for use in commercial applications. A robust and accurate system is needed. Furthermore, a system that can estimate in advance the value of tip-tower clearance at the next "closest approach position" is also needed, since such advanced estimate can be used in turbine control logic to take corrective action. For example, turbine-control action is taken to increase the safety of operation when the tip-tower clearance falls below a pre-determined threshold. Such action may include, for example, reducing the loads on the blade 100 by changing the pitch angle β, or reducing the rotational speed ω.

Tip-tower clearance estimators currently known in the art are either too inaccurate, too expensive, or unreliable, for use in commercial applications. A robust and accurate system is needed. EP 2 402 603 A2, DE 10 2006 054 667 A1, DE 10 2005 048 805 523 A1, US 2004/0057828 A1 all employ an active transmitter either at the blade tip or placed circumferentially around the tower to measure the tip-tower clearance. The active transmitter disclosed include light-emitting systems, acoustic systems, radar systems, or electromagnetic inductance systems. It is well known in the art, however, that any electrical system at the blade-tip in electrical contact with the rest of the electrical system in the turbine is not permitted in the field due to the likely event of lightning strikes. Thus, the only acceptable solutions in the prior art are those that use a passive system at the blade tip. All acceptable prior-art systems employ one or more active transmitters positioned on the tower. To cover all possible wind-turbine configurations, as the yaw angle is changed to follow the wind direction, prior-art systems employ a multitude of sensors spatially spaced around the circumference of the tower. Since the systems are external to the tower, they are in an active lightning-strike zone, and must be protected against lightning. Furthermore, current tower heights are well above 100 meters, making the location of these sensors on the tower difficult to reach and service. These systems are, thus, no-optimal due to both high cost for the initial capital investment, and high cost in maintenance.

What is needed is a tip-tower clearance system wherein both tower and blade-tip components are passive, low-cost, without need of maintenance, robust against harsh operating conditions, and robust against lightning strikes.

Furthermore, prior-art systems only measure the tip-tower clearance as the blade is passing. A system that can estimate in advance the value of tip-tower clearance at the next "closest approach position" is also needed, since such advanced estimate can be used in turbine control logic to take corrective action. For example, turbine-control action is taken to increase the safety of operation when the tip-tower clearance falls below a pre-determined threshold. Such action may include, for example, reducing the loads on the blade 100 by changing the pitch angle β, or reducing the rotational speed w.

According to a first aspect of the present invention there is provided a wind turbine, the wind turbine comprising a tower, a nacelle, a hub and at least one blade attached rectangular to the hub, the at least one blade having a blade-tip section, the hub rotating about a hub rotational axis with rotational speed, a rotor encoder providing a measurement of the rotor angular position about said hub rotational axis relative to a reference position, the rotor angular position being a detecting position when the at least one blade is pointing towards the ground and is parallel to the tower, the wind turbine having a turbine control system running a turbine control logic, the wind turbine further comprising:

- an indicator-stripe positioned in the blade-tip section and circumscribing or encircling the blade-tip section,
- an indicator-ring circumscribing or encircling the tower, the indicator-ring located on the tower at a distance from the hub essentially equal to the distance of the indicator-stripe to the hub,
- a camera or first camera having an image plane or first image-plane, the camera or first camera being oriented to place the indicator stripe and indicator-ring within the image plane or first image plane when the rotor angular position is equal to the detecting position, the camera or first camera digitally recording the image on the image-plane or first image plane when the rotor angular position is equal to the detecting position, the camera or first camera storing the digitally recorded image information for further processing, and
- an image processor and tip-tower clearance calculator unit receiving the digitally recorded image information and calculating a physical separation distance between the indicator stripe and the indicator ring using the digitally recorded image information, the physical separation distance being indicative of the or a blade-tip to tower clearance.

According to an embodiment the physical separation distance being transmitted to the turbine control system for use in the turbine control logic.

According to another embodiment the nacelle is rotationally mounted to the top of the tower to permit yawing motion about a tower axis. In particular, said yawing motion is characterized by a yaw angle. The yaw angle is also referred to as turbine yaw angle. Preferably, the camera or first camera is located inside the nacelle. In particular, the indicator ring possesses material thickness so as to increase or effectively increase the diameter of the tower, the material thickness of the indicator ring allowing the indicator ring to remain visible to the camera or first camera at all yaw angles. Preferably, the indicator ring provides a normal surface to the camera viewing axis to increase the visibility of the indicator ring in the viewing image of the camera.

Preferably, the at least one blade has a longitudinal axis. According to yet another embodiment, the at least one blade being rotationally attached to the hub to allow pitching motion about said longitudinal axis, said pitching motion being characterized by a pitch-angle.

According to a second aspect of the present invention there is provided a method for estimating a blade-tip to tower distance in a wind turbine, the wind turbine comprising a tower, a nacelle, a hub and at least one blade attached rectangular to the hub, the at least one blade having a blade-tip section and a longitudinal axis, the hub rotating about a hub rotational axis with rotational speed, a rotor encoder providing a measurement of the rotor angular position about said hub rotational axis relative to a reference position, the rotor angular position being a detecting position when the at least one blade is pointing towards the ground and is parallel to the tower, a synch pulse generated each time the rotor angular position is equal to the detecting position, the wind turbine having a turbine control system running a turbine control logic, a measuring system producing a tip-tower clearance signal indicative of the blade-tip to tower distance when the at least one blade is in closest approach position to the tower. A blade-deflection measuring system provides at least one blade-deflection signal indicative of the instantaneous blade shape, the blade-deflection signal being present when rotor angular position is equal to the detecting position and present when the rotor angular position is equal to a sensing position. Preferably, the sensing position is defined as a rotor angular position different from the detecting position. In particular, the sensing position is defined as a rotor angular position that is different from the detecting position. Further, a computational unit receives the blade-deflection signal, the tip-tower clearance signal, and the sync pulse, the computational unit building a data vector upon the arrival of the sync pulse so that both the tip-tower clearance signal and the blade-deflection signal represent values occurring at essentially the same moment in time, the collection of data vectors generated during turbine operation being collected in a table, the length of the table increasing with time. Furthermore, the computational unit receives the blade-deflection signal when the rotor angular position is equal to the sensing position, the computational unit using the table to define a functional relationship between the blade deflection signal and a tip-tower clearance estimate, the functional relationship being updated as more data is added to the data vector to allow the functional relationship to increase in accuracy and to capture changes in the blade's structure. In addition, the tip-tower clearance estimate is transmitted to the turbine control system.

According to an embodiment, the at least one blade being rotationally attached to the hub to allow pitching motion about said longitudinal axis, said pitching motion being characterized by a pitch-angle, the computational unit receiving a signal indicative of the pitch-angle and including the value of the pitch-angle in the data vector.

According to another embodiment the computational unit receives a signal indicative of the rotational speed and includes the value of the rotational speed in the data vector.

According to yet another embodiment the at least one blade has an internal hollow volume extending along the longitudinal axis, the blade-deflection measuring system comprising a camera or second camera located inside the hollow volume, the camera or second camera having an image plane, and the system further comprising at least one reflector inside the hollow volume and fixedly positioned to the blade material delineating the hollow volume, the at least one reflector being visible in the image-plane of the camera or second camera, the camera or second camera computing the blade-deflection signal using the position of the at least one reflector in the image plane.

According to both the first aspect of the invention and the second aspect of the invention, the wind turbine preferably comprises a rotor, the rotor comprising the hub and the at least one blade. In particular, the hub rotational axis is also referred to as rotor axis or rotor rotational axis. Preferably, the rotor angular position is also referred to as hub angular position. Particularly, the rotor rotational speed is also referred to hub rotational speed.

Embodiments of the invention will now be described, by way of example only, with reference to the accompanying drawings, in which.

Figure 1:
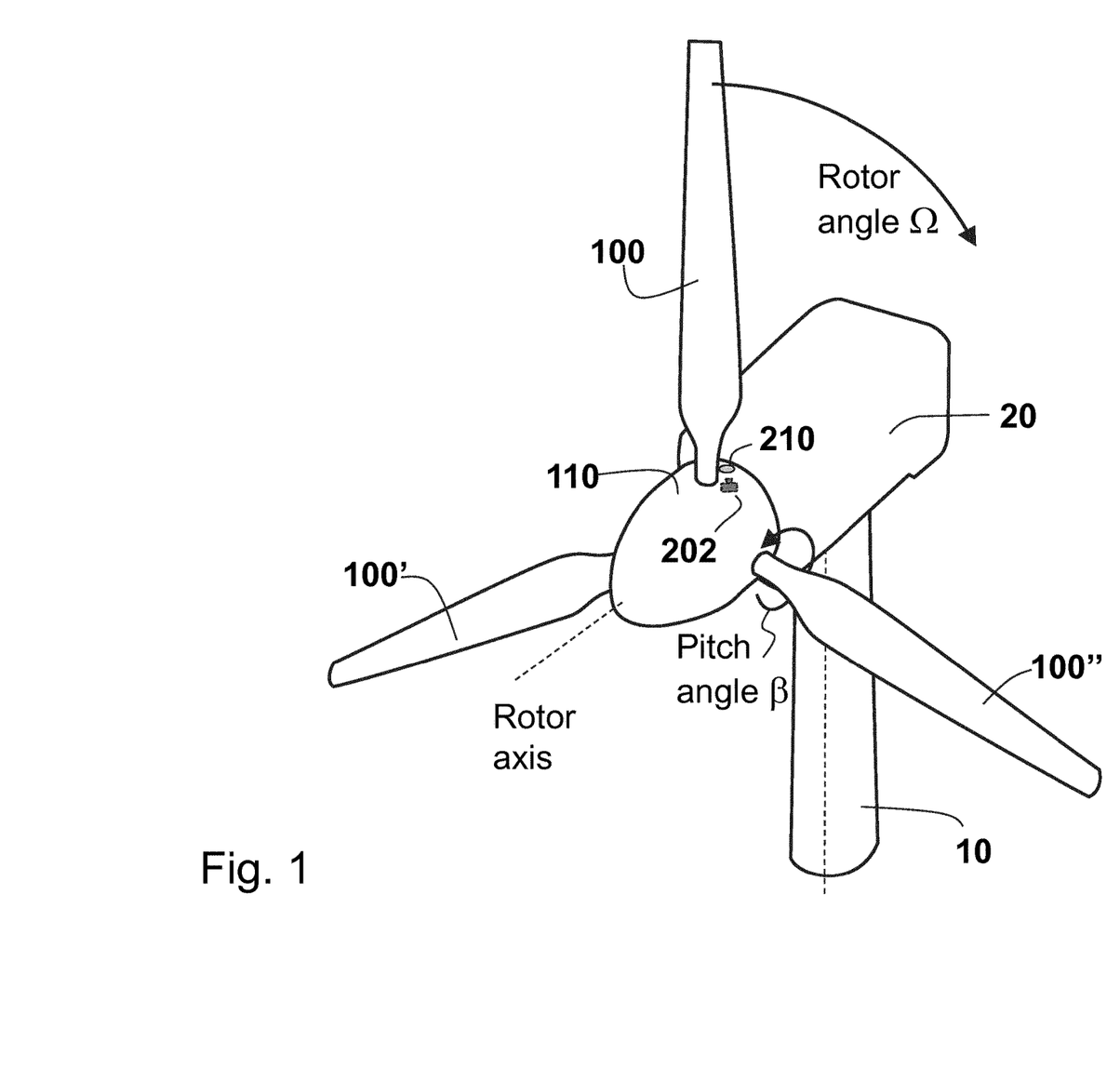
FIG. 1 shows a wind turbine having a tower, a nacelle, a hub and at least one blade attached to the hub.

Ref to FIG. 1 a wind turbine 1 comprises a tower 10, a nacelle 20, a hub 110 and one or more blades 100, 100', 100" attached to the hub. The hub rotates about a hub rotational axis (rotor axis), typically described by a main shaft 30, and a rotor encoder 40 provides a measurement of the rotor angular position (hub angular position) $\Omega$ relative to a reference direction, typically the vertical direction. The rotor rotational speed (hub rotational speed), denoted $\omega$ is obtained as the time derivative of the rotor angular position $\Omega$. The nacelle 20 is rotationally mounted to the top of tower 10 to permit yawing motion about the tower axis, thereby orienting the rotor axis into the wind direction. In particular, the yawing motion is characterized by a yaw angle.

Each blade has a blade-root section attached to the hub 110, and a blade-tip section at the opposite extreme of the blade. A system for measuring the distance between the blade tip and the tower is presented, as well as a system for estimating both the position of the blade tip relative to the blade root.

Since the strike of blade 100 against the tower 10 is a catastrophic event, the minimum distance between the blade-tip and the tower 10 must be greater than a prescribed minimum at all times during rotor rotation in order for the wind turbine to be certified for operation. This minimum distance is referred to herein as the "tip-tower clearance", and it occurs when the blade is at "closest approach position".

Without loss of generality, and in the interest of conciseness, it is understood that duplication and extension of the invention to other blades attached to the hub, such as blades 100' and 100" in FIG. 1, is both possible and desirable, and can be performed using the same steps described herein for blade 100.

Blade 100 has a "closest approach position" when the rotor angular position is $\Omega_0$, at which point the blade 100 is pointing towards the ground and is parallel to the tower. $\Omega_0$ is also referred to as "detecting position".

Figure 2A:
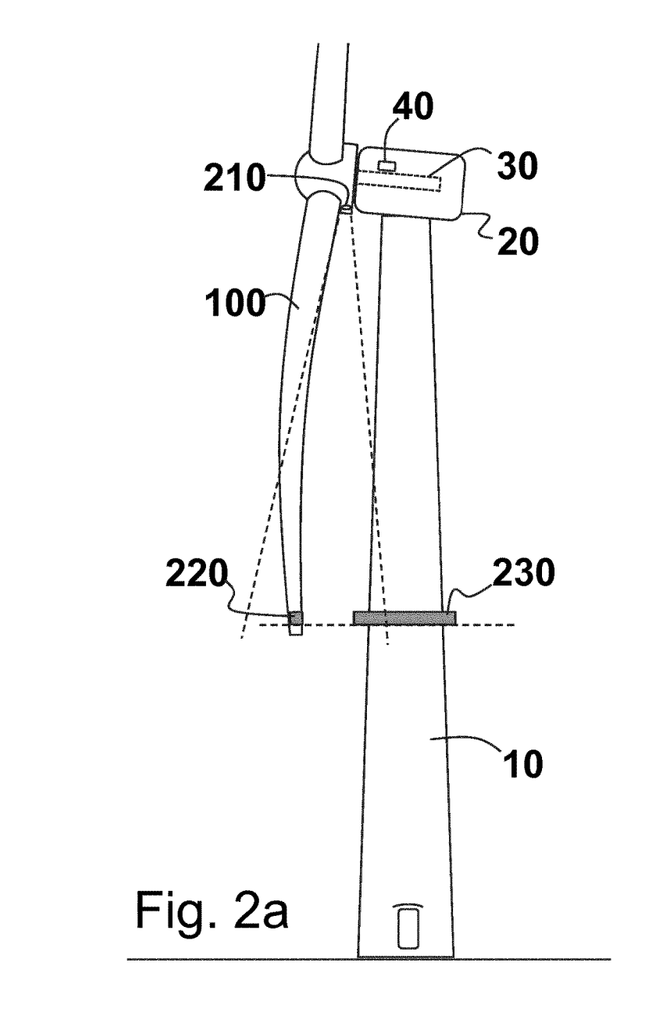
FIG. 2a shows an embodiment of the wind turbine having a moving camera associated with one of the blades.
Figure 2B:
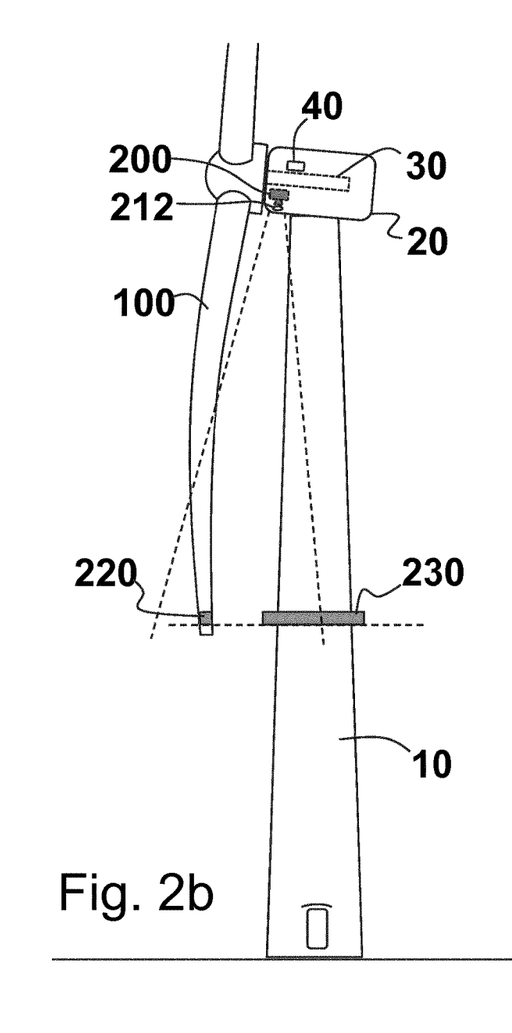
FIG. 2b shows another embodiment of the wind turbine having a camera located inside the nacelle.

A preferred embodiment is shown in FIG. 2b. In the preferred embodiment, a first camera 200 is located inside the nacelle 20. The first camera 200 looks through opening 212 in the nacelle 20 and the first camera 200 is positioned and oriented such that the field of view of the first camera 200 extends along the length of the tower 10, and places the tip of blade 100 essentially in the middle of, or at a predetermined location in, the viewing image when blade 100 is in the closest approach position. Thus, when blade 100 is at the closest approach position, both the blade tip and part of the tower surface are within the field of view of first camera 200. The first camera 200 is a digital camera that has a viewing image projected onto an image sensor, such as a CMOS sensor, that can be sampled and the associated data stored electronically.

Another preferred embodiment (further embodiment) is shown in FIGS. 2a and 1. In the further embodiment, the first camera 200 is absent, and a first moving camera 202 is associated with blade 100. The first moving camera 202 rotates synchronous with blade 100 about the hub rotational axis, and may be located externally to the hub 110, but is preferably located inside the hub 110 for protection against the weather, and lightning strikes. When located inside the hub, the first moving camera 202 does not rotate along the blade-axis when the blade 100 pitch angle β is changed. The first moving camera 202 looks through opening 210 in the hub 110. The first moving camera 202 is a digital camera that has a viewing image projected onto an image sensor, such as a CMOS sensor, that can be sampled and the associated data stored electronically. The first moving camera 202 is positioned and oriented such that the field of view of the first moving camera 202 extends along the length of blade 100, and places the tip of blade 100 essentially in the middle of, or at a predetermined location in, the viewing image. In this further embodiment, when multiple blades are attached to the hub, each blade has a first moving camera 202 associated with it.

In the following description, first camera 200 and first moving camera 202 are functionally equivalent and are interchangeable in the text. Thus, for brevity, only first camera 200 is mentioned. In particular, the following description is valid for both the preferred embodiment and the further embodiment (even though when the expression preferred embodiment is used). Furthermore, for brevity, only blade 100 is mentioned, but it should be understood that the description is equally valid for other blades 100' and 100'' when such blades are present.

The first camera 200 is functionally connected with the rotor encoder 40, so that a trigger pulse (synch pulse) is received by camera 200 when the rotor angular position is equal to $\Omega_0$ and the blade 100 is at its closest approach position. If the reaction-time of the camera to the trigger pulse includes a known delay in time, the trigger pulse can be generated with a predetermined anticipation to compensate for the delay. The first camera digitally records the image on the image-plane when the synch pulse is received (rotor angular position is equal to $\Omega_0$) and the camera store the digitally recorded image information for further processing.

Blade 100 further comprises an indicator stripe 220 on its surface. The indicator stripe 220 is located close to the tip of blade 100, and may consist of a painted stripe on the blade surface, or, more preferably, a retro-reflective stripe. The indicator stripe 220 is located to be visible in the camera 200 viewing image, and circumscribes or encircles the blade 200 so as to remain visible to the first camera 200 as the blade 100 is pitched to different angles β during turbine operation.

Tower 10 comprises an indicator ring 230 that circumscribes or encircles the tower, and is visible within the viewing image of camera 200. The indicator ring 230 has the same shape as the cross-section of the tower, hence is circular in shape when the tower is purely conical or cylindrical in shape. The indicator ring 230 is positioned along the tower at the same height above ground as the height of indicator stripe 220 when blade 100 is at the closest approach position, so that the indicator ring 230 is essentially at equal distance to camera 200 as the indicator stripe 220. Preferably, indicator ring 230 possesses material thickness so as to effectively increase the diameter of the tower, and, thereby, provide a normal surface to the camera viewing axis to increase the visibility of the indicator ring 230 in the viewing image of camera 200. Since the indicator ring circumscribes, or encircles, the tower, the indicator ring remains visible to camera 200 at all turbine yaw angles.

Figure 3A:
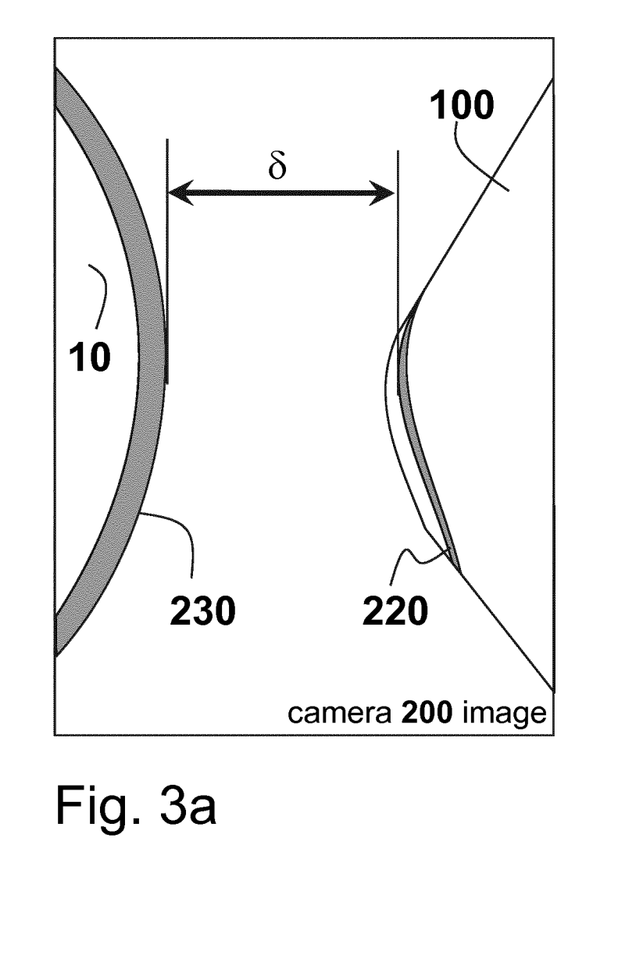
FIG. 3a shows a sketch of a viewing image of the camera or moving camera when the blade is at its closest approach to the tower in case of a normal blade loading.
Figure 3B:
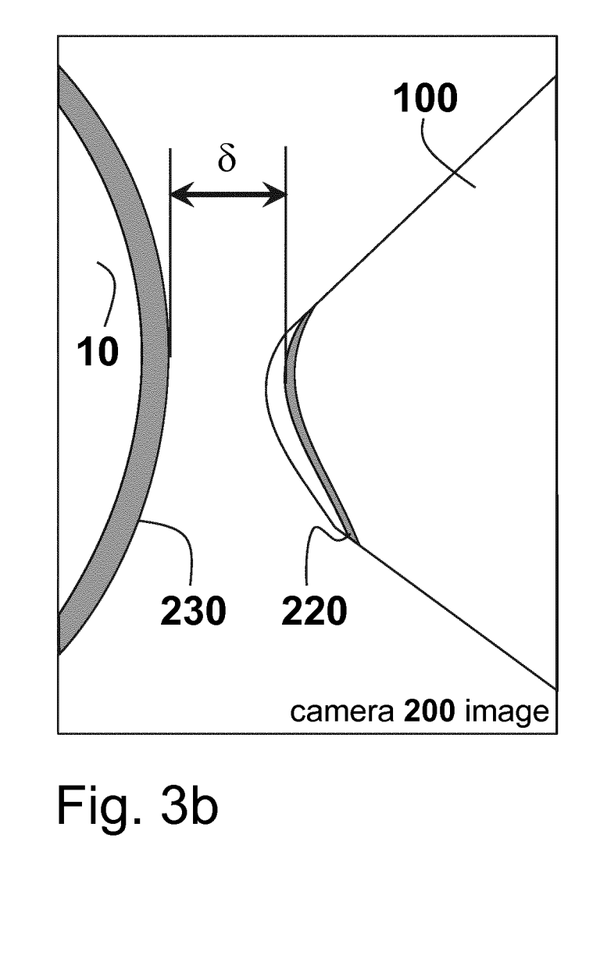
FIG. 3b shows a sketch of a viewing image of the camera or moving camera when the blade is at its closest approach to the tower in case of a high blade loading.

FIGS. 3a and 3b shows a sketch of the viewing image of camera 200 when the rotor angular position is equal to 00 and the blade 100 is at its closest approach to the tower 10. FIG. 3a shows the case of normal blade loading, and FIG. 3b the case of high blade loading. Because the indicator ring 230 and the indicator stripe 220 are at essentially the same distance to camera 200, the physical distance, σ, between any point on the indicator ring 230 and any point on the indicator stripe 220 is linearly proportional to the distance in the viewing-image of the corresponding point on indicator ring 230 and the corresponding point on indicator stripe 220 in the first camera's image sensor, indicated by δ in FIG. 3a. In the preferred embodiment, the viewing image is a CCD or CMOS sensor, and said viewing-image distance δ can be determined in terms of pixel count. The measured tip-tower distance σ in physical dimensions (e.g. meters) is computed from the corresponding pixel value δ using an image processor and tip-tower clearance calculator 400. The image processor and tip-tower clearance calculator 400 uses the known distance of camera 200 to indicator stripe 220 and rules of geometrical optics, as is well known in the art.

The tip-tower clearance, Δ, is then computed as the minimum value of the distance σ during one blade passage by the tower.

In particular, the process of determining the tip-tower clearance comprises freezing and digitally storing the image-plane at the instant the blade is at its closest-approach position, processing the digitally image to determine the minimum pixel count separating the image of indicator stripe 220 and indicator ring 230, and calculating the associated physical distance Δ.

Under loading, blade 100 has increased bending, and the blade-tip approaches the tower 10 when the blade is at the closest approach position. Consequently, the viewing-image distance δ of the indicator ring 230 and indicator stripe 220 in the viewing image decreases.

During operation, first camera 200 may undergoes some small rotation relative to the hub 110 or blade 100 due to material deformations of the hub 110, or deformation of the mounting support used to attach the first camera 200 to the hub 110. While this rotation can be minimized through a strong mechanical attachment, some small and unwanted camera rotation inevitably remains in actual installations. Therefore, we note that the current invention inherently provides a method for complete camera rotation compensation, whenever camera rotational motion occurs, since the pixel value δ is invariant under camera rotation. In particular, camera rotation generates an equal translation of the indicator-ring 230 and indicator stripe 220 on the viewing image, hence does not affect the distance between the two indicators. On the other hand, the estimation of blade-tip position using indicator-stripe 220 alone would be highly sensitive to camera motion, and would be, therefore, unreliable.

Figure 5:
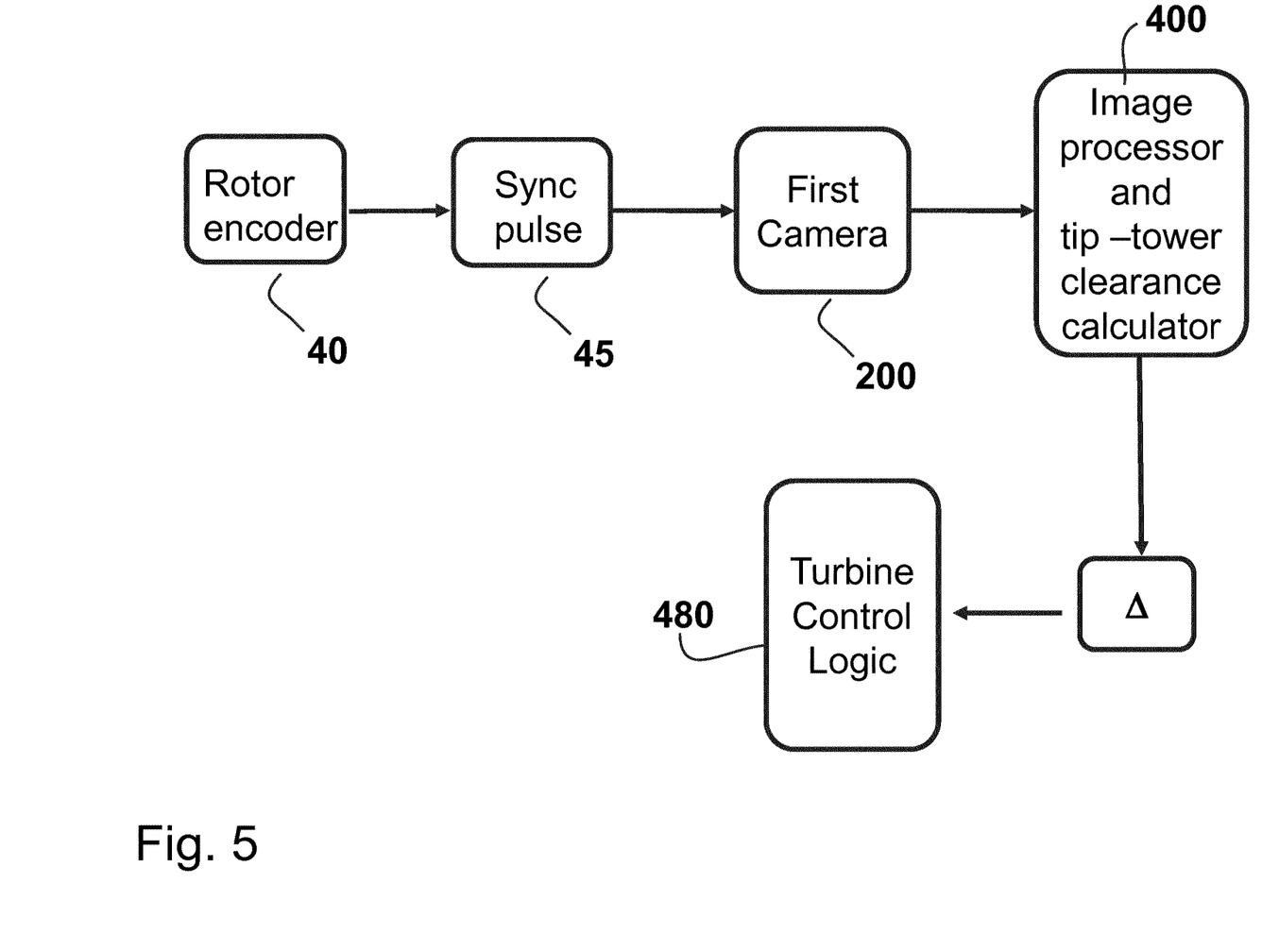
FIG. 5 illustrates an example of producing a tip tower clearance signal.

Ref to FIG. 5 the value Δ, indicative of tip-tower clearance, is determined as the minimum of σ during one blade passage of the tower, and Δ is transmitted to the turbine control logic 480, where it is incorporated in control-logic actions.

The system comprising camera 200 and indicator ring 230 provides a direct measurement of the tip to tower clearance Δ when the rotor angular position is equal to $\Omega_0$, corresponding to the blade 100's closest-approach position, but does not provide a measurement, or estimate of the tip-tower clearance when the rotor angular position is at a sensing position $\Omega_1$. In particular, $\Omega_1$ is different from $\Omega_0$. For example, when the blade 100 is vertical pointing upwards, a sudden increase in wind speed would generate increased blade bending, and if the increased wind speed would persist, the increased bending would, in turn, produce a decreased the tip-tower clearance at the next blade-tower passage. For turbine control purposes, it is beneficial to predict, or anticipate, the tip-to-tower clearance at the next closest-approach position, so as to enable appropriate control actions can be taken pre-emptively.

To supply tip-tower clearance estimates on a time-continuous basis, the preferred embodiment comprises a blade-deflection measuring system that provides at least one signal indicative of the blade's instantaneous geometrical shape. As example, a blade-deflection measuring system uses strain gauges to measure blade material strain at the blade root. The material strain increases in proportion to blade loads, and blade bending also increases with blade loads, so an indirect indication of the current blade geometrical configuration (i.e. bending) can be deduced. Additional sensors, such as gyroscopes and accelerometers located along the blade span, can be used to improve the accuracy of the deduction.

Figure 4:
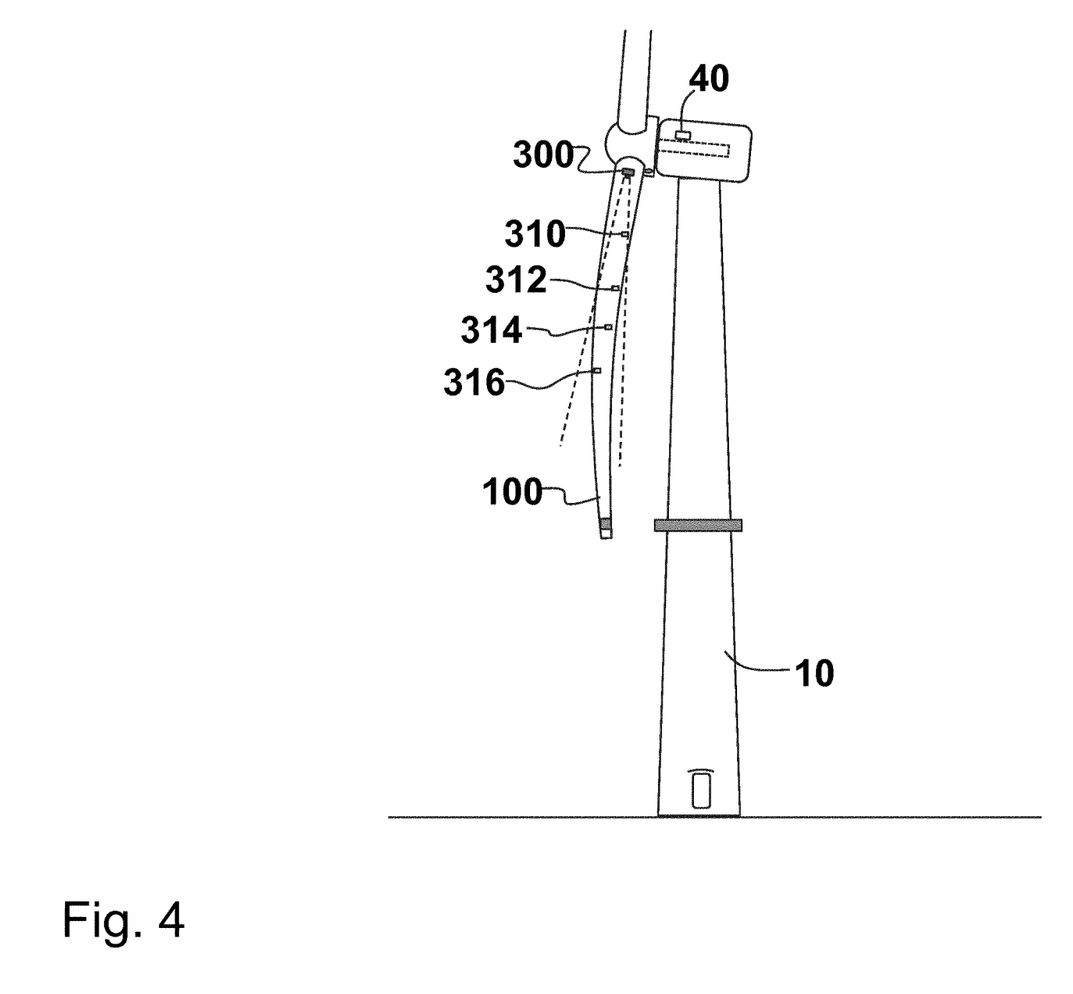
FIG. 4 shows a blade-deflection measuring system.

Ref to FIG. 4, in the preferred embodiment, the blade 100 comprises an optically unobstructed volume extending at least partially into the blade 100, and a blade-deflection measuring system comprising a second camera 300 located inside the blade 100 at, or near, the blade root and oriented to look into the optically unobstructed volume of blade 100. Inside the blade, at pre-selected span locations ("span" is the coordinate along the blade axis) of the optically unobstructed volume, reflectors are bonded to the blade surface. While at least one reflector is needed, the preferred embodiment uses 4 (four) or 5 (five) reflectors at increasing span locations. In reference to FIG. 4, the second camera 300 and four reflectors 310, 312, 314, 316 are shown.

The reflectors are visible in the image-plane of second camera 300, and the reflectors move relative to the second camera when the blade undergoes bending. Accordingly, the deflection of the blade 100 can be inferred from the motion of the reflectors in the second camera's image-plane. The blade-deflection measuring system provides deflection measurements $S_1$, $S_2$, $S_3$, $S_4$ indicative of the blade deflection (from a zero-load configuration) at the selected blade-span locations where the reflectors are located.

Figure 6:
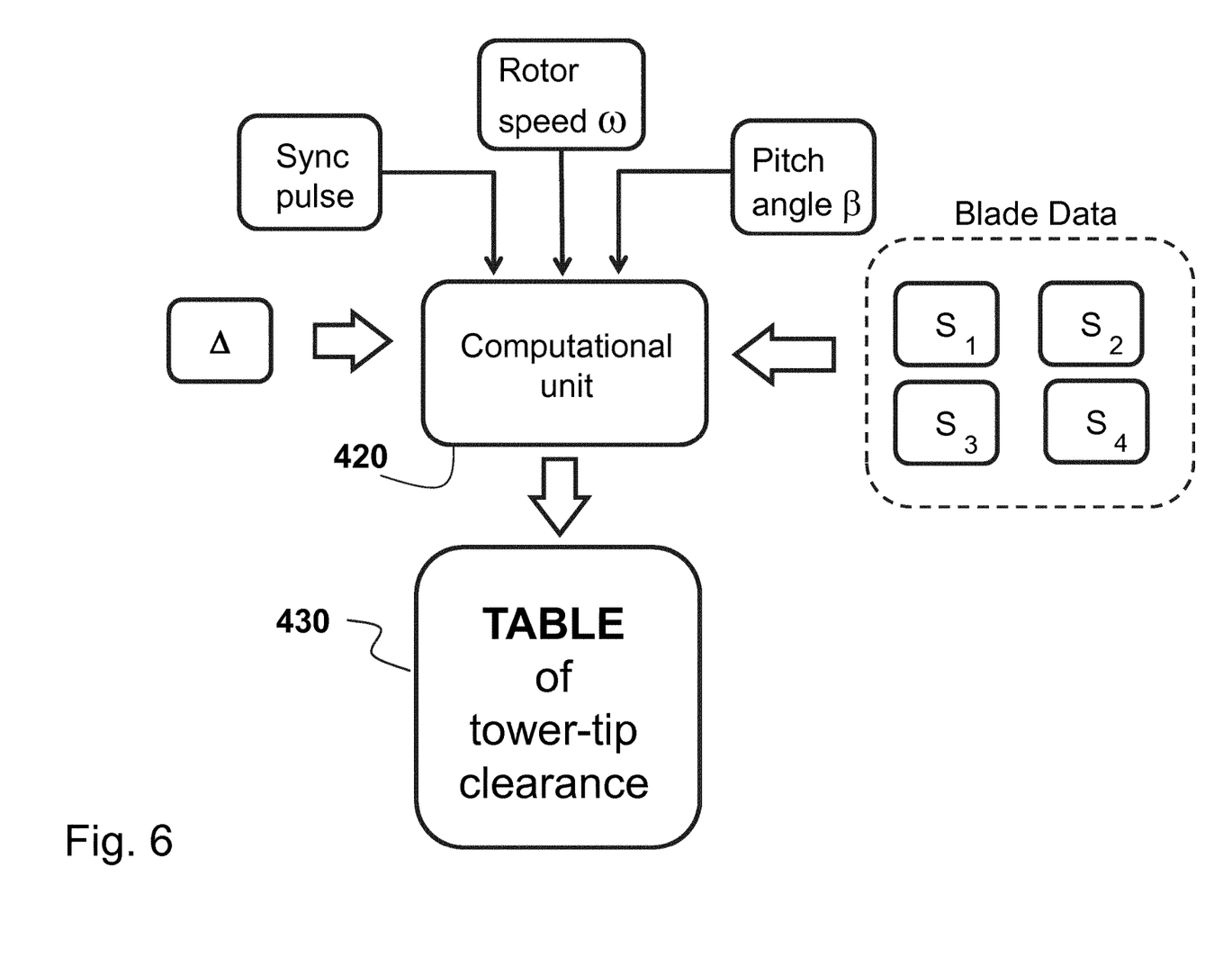
FIG. 6 illustrates an example of creating a table.
Figure 7:
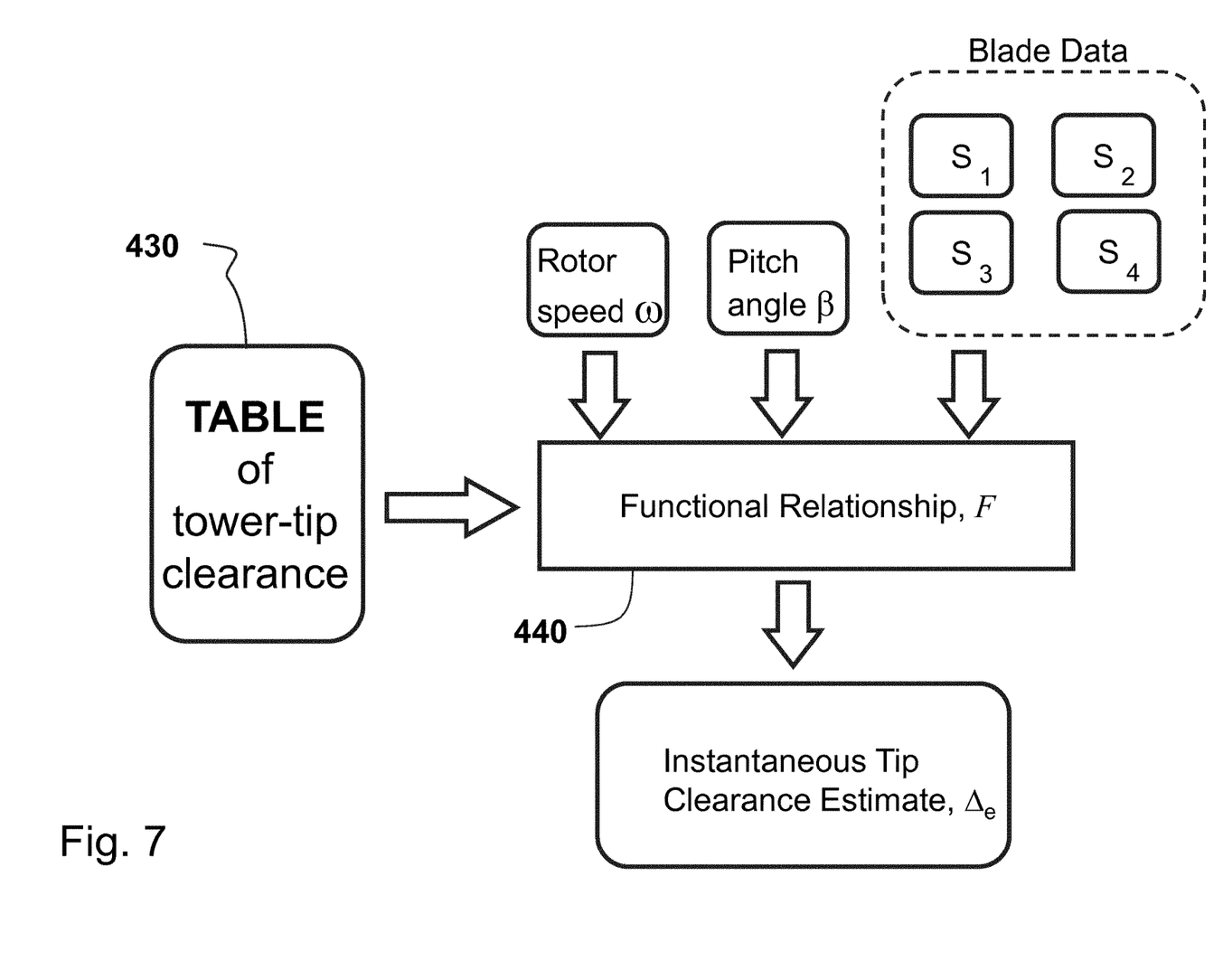
FIG. 7 illustrates an example of generating a tip-tower clearance estimate.

Ref to FIGS. 6 and 7 a computational unit 420 receives the blade deflection signals $S_1$, $S_2$, $S_3$, $S_4$, the tip-tower clearance, Δ, the sync pulse 45, and signals indicative of rotor speed ω, and pitch angle β. All these signals are time synchronized, so that, upon the arrival of the sync pulse 45, the instantaneous values of $S_1$, $S_2$, $S_3$, $S_4$, $\Delta_e$, ω, β represent measurements made at the same instant in time, and are linked together into a time-synchronous data vector $\{\Delta, S_1, S_2, S_3, S_4, \omega, \beta\}$. Data vectors are stored in tabular form, or equivalent functional form, in table 430. One such data vector is created every passage of blade 100 through its closest-approach position.

The collection of many data vectors $\{\Delta, S_1, S_2, S_3, S_4, \omega, \beta\}$ in table 430 allows the computational unit to generate a functional relationship, F, between a tip-tower clearance estimate $\Delta_e$ and the remaining quantities $S_1$, $S_2$, $S_3$, $S_4$, ω, β:

$$\Delta_e = F(S_1, S_2, S_3, S_4, \omega, \beta)$$

Thus, given $S_1$, $S_2$, $S_3$, $S_4$, ω, β measured at some instant in time, a tip-tower clearance estimate is computed, even though the rotor angular position is not $\Omega_0$. If the evaluation is done prior to the blade passing through its nearest-approach position, then the estimated tip-tower clearance is an advanced estimate of the value the blade will produce when reaching the nearest-approach position.

The instantaneous wind-field characteristics may be known to the computational unit. For example, the wind turbine could be outfitted with a LIDAR unit that provides measurements of both wind speed, U, and wind vertical shear, S, either ahead of the turbine, or at the turbine itself. The most preferred form of functional relation F incorporates the wind information, and the rotor angular position Ω and temperature T, to provide a more accurate estimate of the tip-tower clearance when the rotor angular position is not $\Omega_0$:

$$\Delta_e = F(S_1, S_2, S_3, S_4, \omega, \beta, \Omega, U, S, T)$$

For example, wind shear, S, causes the blade to undergo a 1-per-revolution sinusoidal motion in and out of the rotor plane. This information is used within F to include wind shear generated motion when providing an estimate of the tip-tower clearance.

The estimated, instantaneous, tip-clearance $\Delta_e$ is sent to the turbine controller 480 and the estimate provides a look-ahead prediction of the blade tip-to-tower clearance—which can be used to take appropriate control actions, if necessary.

The length of the table 430 increases with time, and, therewith, its completeness. The computational unit updates the functional relationship, F, as more data is made available. Therefore, the instantaneous tip-clearance estimate improves in accuracy with the length of table 430, and the functional relationship is updated in time to capture changes in the blade's structure.

Additional processes that affect the blade's structural state, or the blade's aerodynamic state are incorporated into table 430. For example, the formation of ice on the blade surface alters both the blade mass distribution and the blade aerodynamic forces. The computational unit considers these physical events in its computation of the instantaneous tip-clearance estimate. Relevant physical events include, but are not limited to, temperature, structural aging, ice formation, surface soiling, and leading edge erosion.

To compensate for surface soiling and leading-edge erosion, a test turbine blade can be temporarily fitted with surface-roughness strips along its length at predetermined locations. The table 430 is then extended to include these cases.

To compensate for surface icing, a test turbine blade can be temporarily fitted with added mass along its length at predetermined locations. The table 430 is then extended to include these cases.

To compensate for structural aging, the table 430 is periodically archived and a new table is constructed (at predetermined time intervals, e.g. every year). The table is enlarged during normal turbine operation, and the functional relation F is also updated during turbine operation, so that these processes do not necessitate stopping the turbine, and causing a loss of energy generation.

Table 430 can also be shared between turbines having blades of the same type. This option greatly accelerates the creation of a complete table 430, since turbines in different climatic conditions and different aging states contribute to its formation.

In case of multiple blades, the above invention is repeated for each blade. Thus, a synch pulse is received when each blade is at its closest approach position, and a tip-tower clearance estimate is produced for each blade. Since the hub 110 rotates in the same direction at all times, the order of passage of each blade through its own closest-approach position is fixed and known. This order allows one to use the tip-tower clearance of a leading blade as estimate of the tip-tower clearance of the following blade. Such estimate can be combined with the estimate $\Delta_e$ to provide an improved tip-tower clearance estimate for each blade.

The current invention provides a tip-tower clearance measurement wherein both tower and blade-tip components are passive, low-cost, without need of maintenance, robust against harsh operating conditions, and robust against lightning strikes, the active element is inside the nacelle or hub, hence well protected against harsh conditions, lightning strikes, and is easy to reach and service, the cost of the system is low, and the system can provide advanced estimates of the tip-tower clearance before the blade reaches the closest-approach position.

The invention claimed is:

1. A wind turbine comprising:
   a tower having a top;
   a nacelle;
   a hub configured to rotate about a hub rotational axis with rotational speed ($\omega$);
   at least one blade attached rectangular to the hub, the at least one blade having a blade-tip section;
   a rotor encoder providing a measurement of a rotor angular position ($\Omega$) about said hub rotational axis relative to a reference position, the rotor angular position being a detecting position ($\Omega_0$) when the at least one blade is pointing vertically downwards and is parallel to the tower;
   a turbine control system running a turbine control logic, wherein the nacelle is rotationally mounted to the top of the tower to permit yawing motion about a tower axis;
   the at least one blade being rotationally attached to the hub to allow pitching motion about a longitudinal axis of the at least one blade;
   an indicator-stripe positioned in the blade-tip section and encircling the blade-tip section;
   an indicator-ring encircling the tower, the indicator-ring located on the tower at a distance from the hub substantially equal to a distance of the indicator-stripe to the hub;
   a camera having an image-plane, the camera being oriented to place the indicator stripe and indicator-ring within the image-plane when the rotor angular position is equal to the detecting position ($\Omega_0$), the camera configured to record the image on the image-plane when the rotor angular position is equal to the detecting position ($\Omega_0$) and to produce digitally recorded image information; and
   an image processor and tip-tower clearance calculator unit receiving the digitally recorded image information and calculating a physical separation distance between the indicator stripe and the indicator ring using the digitally recorded image information, the physical separation distance being indicative of a blade-tip section to tower clearance.

2. The wind turbine of claim 1, wherein the camera is further configured to store the digitally recorded image information for further processing.

3. The wind turbine of claim 1, wherein the image processor and tip-tower clearance calculator unit is configured to transmit the physical separation distance to the turbine control system for use in the turbine control logic.

4. The wind turbine of claim 1, wherein the camera is located inside the nacelle.

5. The wind turbine of claim 1, wherein:
   said yawing motion is characterized by a yaw angle; and
   the indicator ring possesses a material thickness so as to effectively increase a diameter of the tower, the material thickness of the indicator ring enabling the indicator ring to remain visible to the camera at all yaw angles.

6. A wind turbine incorporating a tower having a top, a nacelle, a hub configured to rotate about a hub rotational axis with rotational speed ($\omega$), at least one blade attached rectangular to the hub, the at least one blade having a blade-tip section, a rotor encoder providing a measurement of a rotor angular position ($\Omega$) about said hub rotational axis relative to a reference position, the rotor angular position being a detecting position ($\Omega_0$) when the at least one blade is pointing vertically downwards and is parallel to the tower, and a turbine control system running a turbine control logic, wherein the nacelle is rotationally mounted to the top of the tower to permit yawing motion about a tower axis, and wherein the at least one blade is rotationally attached to the hub to allow pitching motion about a longitudinal axis of the at least one blade; the wind turbine comprising:
   an indicator stripe positioned in the blade-tip section and encircling the blade-tip section;
   an indicator-ring encircling the tower, the indicator-ring located on the tower at a distance from the hub substantially equal to a distance of the indicator stripe to the hub;
   a camera having an image-plane, the camera being located inside the nacelle and oriented to place the indicator stripe and indicator-ring within the image-plane when the rotor angular position is equal to the detecting position ($\Omega_0$), the camera configured to record the image on the image-plane when the rotor angular position is equal to the detecting position ($\Omega_0$) and to produce digitally recorded image information; and
   an image processor and tip-tower clearance calculator unit receiving the digitally recorded image information and calculating a physical separation distance between the indicator stripe and the indicator ring using the digitally recorded image information, the physical separation distance being indicative of a blade-tip-section to tower clearance.

7. The wind turbine of claim 6, wherein the camera is further configured to store the digitally recorded image information for further processing.

8. The wind turbine of claim 6, wherein the image processor and tip-tower clearance calculator unit is configured to transmit the physical separation distance to the turbine control system for use in the turbine control logic.

9. The wind turbine of claim 6, wherein said yawing motion is characterized by a yaw angle.

10. The wind turbine of claim 6, wherein the indicator ring possesses a material thickness so as to effectively increase a diameter of the tower.

11. The wind turbine of claim 6, wherein a material thickness of the indicator ring enables the indicator ring to remain visible to the camera at all yaw angles.

12. A method for controlling a wind turbine, wherein the wind turbine incorporates a tower having a top, a nacelle, a hub configured to rotate about a hub rotational axis with rotational speed ($\omega$), at least one blade attached rectangular to the hub, the at least one blade having a blade-tip section, a rotor encoder providing a measurement of a rotor angular position ($\Omega$) about said hub rotational axis relative to a reference position, the rotor angular position being a detecting position ($\Omega_0$) when the at least one blade is pointing vertically downwards and is parallel to the tower, and a turbine control system running a turbine control logic, wherein the nacelle is rotationally mounted to the top of the tower to permit yawing motion about a tower axis, with the at least one blade being rotationally attached to the hub to allow pitching motion about a longitudinal axis of the at least one blade, the method comprising:

- positioning an indicator stripe in the blade-tip section so as to encircle the blade-tip section;
- using an indicator-ring to encircle the tower such that the indicator-ring is located on the tower at a distance from the hub substantially equal to a distance of the indicator stripe to the hub;
- using a camera being oriented to place the indicator stripe and indicator-ring within an image-plane of the camera when the rotor angular position is equal to the detecting position ($\Omega_0$);
- using the camera to digitally record image information forming an image on the image-plane when the rotor angular position is equal to the detecting position ($\Omega_0$);
- using an image processor and tip-tower clearance calculator unit receiving the digitally recorded image information and calculating a physical separation distance between the indicator stripe and the indicator ring using the digitally recorded image information, a physical separation distance being indicative of the blade-tip-section to tower clearance.

13. The method of claim 12, further comprising using the camera to store the digitally recorded image information for further processing.

14. The method of claim 12, further comprising using the image processor and tip-tower clearance calculator unit to transmit the physical separation distance to the turbine control system for use in the turbine control logic.

15. The method of claim 12, further comprising locating the camera inside the nacelle.

16. The method of claim 12, wherein said yawing motion is characterized by a yaw angle.

17. The method of claim 12, further comprising providing the indicator ring with a material thickness so as to effectively increase a diameter of the tower, and such that the material thickness of the indicator ring enables the indicator ring to remain visible to the camera at all yaw angles.

* * * * *